United States Patent
Tanaka et al.

[19]

[11] Patent Number: 5,963,534
[45] Date of Patent: Oct. 5, 1999

[54] DRIVING DEVICE FOR A RECORDING MEDIUM

[75] Inventors: Masanobu Tanaka; Tatsumaro Yamashita, both of Miyagi-ken, Japan

[73] Assignee: Alps Electric Co., Ltd., Tokyo, Japan

[21] Appl. No.: 08/935,582

[22] Filed: Sep. 23, 1997

[30] Foreign Application Priority Data

Sep. 27, 1996  [JP]  Japan .................................. 8-255702

[51] Int. Cl.⁶ ............................ G11B 17/08; G11B 17/04
[52] U.S. Cl. ........................................ 369/202; 360/99.06
[58] Field of Search ............................. 360/99.06, 99.07, 360/133; 369/191, 201, 202, 210, 77.1, 77.2, 127

[56] References Cited

U.S. PATENT DOCUMENTS

| | | | |
|---|---|---|---|
| 4,733,314 | 3/1988 | Ogawa et al. | 360/99.07 |
| 5,062,093 | 10/1991 | Christie et al. | 369/36 |
| 5,144,508 | 9/1992 | Noda et al. | 360/99.06 |
| 5,485,329 | 1/1996 | Lee | 360/99.06 |
| 5,572,497 | 11/1996 | Kim et al. | 369/77.2 |
| 5,696,746 | 12/1997 | Ookawa et al. | 369/77.2 |
| 5,724,210 | 3/1998 | Sawada | 360/99.06 |

*Primary Examiner*—John H. Wolff
*Assistant Examiner*—Angel Castro
*Attorney, Agent, or Firm*—Brinks Hofer Gilson & Lione

[57] ABSTRACT

A driving device in which when a cartridge is inserted with a correct orientation, a retainer protrusion of a drawing-in member engages a retainer recess of the cartridge, so that a sliding shaft of the drawing-in member slides along a guide surface to draw in the cartridge. When the cartridge is inserted with a reversed orientation, the drawing-in member is pushed sideways, so that the sliding shaft slides along a relief guide portion at the exterior side of the guide plate, causing the drawing-in member to be driven in the X1 direction. Since the drawing-in member is driven along the relief guide portion, locking of the mechanism does not occur. Accordingly, it is possible to prevent locking of a mechanism, which occurs when the cartridge is inserted with a wrong orientation, and the drawing-in member, which is not retained by the cartridge, is driven in the drawing-in direction, in a disk device in which a drawing-in member is used to draw in a cartridge of, for example, a mini-disk.

2 Claims, 12 Drawing Sheets

DRIVING DEVICE FOR A RECORDING MEDIUM

BACKGROUND OF THE INVENTION

1. Field of the Invention

The present invention relates to driving device of a recording medium, such as a disk, contained in a cartridge (hard case), which makes it possible to draw in the recording medium to a drivable position and eject the recording medium after the driving. More particularly, the present invention relates to a driving device of a recording medium, which makes it possible to prevent locking of a mechanism after the recording medium has been inserted with a wrong orientation.

2. Description of the Related Art

FIG. 15 is a perspective view of a mini-disk taken as an example of a recording medium.

The mini-disk M is a magneto-optic disk contained in a cartridge C that is a virtually square-shaped hard case in a plane. A center (clamp) hole of a disk D is exposed at the bottom surface of the cartridge C. A slidable shutter S is provided at a right side portion in the direction of insertion of the cartridge C. When the shutter S slides in the X2 direction, a window formed in the cartridge C appears. For a mini-disk M designed specifically for reproduction, when the shutter S slides, a window appears only at the bottom surface of the cartridge, through which an optical head opposes the disk in the cartridge C.

For a mini-disk M for recording, when the shutter S slides, the windows at the bottom and top surfaces of the cartridge C appear, thereby exposing the disk therein from the top and bottom windows. In the recording operation, the optical head opposes the bottom surface of the disk through the bottom window of the cartridge C, whereas a magnetic disk H$m$ contacts the top surface of the disk through the top window of the cartridge C.

The driving device (disk device) of a recording medium corresponding to the mini-disk M to be driven comprises a holder for inserting therein the mini-disk M and a drawing-in member 81 of FIG. 15 disposed at a side portion of the holder. At the drawing-in member 81 is integrally formed a drawing-in pawl 82. When the cartridge C is inserted into the holder in the X1 direction, an insertion side end C2 of the cartridge hits a sloped surface 82$a$ of the drawing-in pawl 82, causing the drawing-in member 81 to rotate in direction (iii). When the cartridge C is further inserted in the X1 direction, the biasing force of a spring or the like causes the drawing-in pawl 82 to move into a retainer recess C1 in a side of the cartridge C. The force produced by the movement of the drawing-in member 81 in the X1 direction causes the cartridge C to be drawn into the holder in the X1 direction.

After the cartridge C has been completely drawn into the holder, the disk in the cartridge C is clamped to a clamp table of a disk drive portion.

In the disk device having a drawing-in member 81 shown in FIG. 15, when the cartridge C is properly inserted with a correct orientation, the drawing-in pawl 82 engages the retainer recess C1 of the cartridge C, and the drawing-in member 81 moves in the X1 direction to thereby draw in the cartridge C into the holder. However, when the cartridge C is inserted with a wrong orientation, there is no retainer recess C1 at a portion opposing the drawing-in pawl 82, so that the drawing-in pawl 82 is pushed by a side portion of the cartridge C, and the drawing-in member 82 remains rotated in direction (iii).

When the cartridge C is inserted a certain amount, and the insertion is detected, the motive force of a motor or the like drives the drawing-in member 81 in the X1 direction. Therefore, when the cartridge C is inserted with the wrong orientation, the drawing-in member 81, which is kept rotated in direction (iii), moves in the X1 direction, causing the drawing-in member 81 moving in the holder to be mechanically locked in the holder. This increases the load of the motor, which causes the motor to break down or the mechanism locked portion to break.

SUMMARY OF THE INVENTION

To overcome the aforementioned conventional problems, it is an object of the present invention to provide a driving device for a recording medium, in which locking of a mechanism does not occur when a drawing-in member is driven inwardly with respect to the holder after a recording medium has been inserted with a wrong orientation, and the insertion has been detected.

To this end, according to the present invention, there is provided a driving device for a recording medium comprising a holder (11) for inserting therein a recording medium (M), a drive portion (Kd) for driving the recording medium (M) that has been drawn into the holder (11), a retainer member (32) for engaging a retainer recess (C1) in a side portion of the recording medium (M) inserted into the holder (11) in order to apply a force to the recording medium (M) for drawing in the medium (M), a biasing member (34) for biasing the retainer member (32) at an insertion waiting position in a direction in which the retainer member (32) is retained in the retainer recess (C1) of the recording medium (M), a guide portion (35$a$) for guiding the retainer member (32) in the drawing-in direction of the recording medium, so that the member (32) does not move out from the retainer recess (C1), a relief guide portion (35$b$) for guiding the retainer member (32), being pushed sideways by a side of the recording medium (M) inserted with a wrong orientation, in the drawing-in direction, so that the retainer member (32) is not retained by the recording medium (M), and a drive member (16) for moving the retainer member (32) in the drawing-in direction either along the guide portion (35$a$) or the relief guide portion (35$b$).

The driving device for a recording medium may further comprise a guide plate (35) extending along a side of the holder (11). The holder side inner surface of the guide plate (35) is the guide portion (35$a$), whereas the opposite outer surface of the guide plate (35) is the relief guide portion (35$b$). A cutout (36), being a division between the guide portion (35$a$) and the relief guide portion (35$b$), is formed at an edge of the guide plate (35). The retainer member (32) may comprise a sliding portion (32$e$) for sliding along either one of the aforementioned guide portions. In an insertion waiting state, the sliding portion (32$e$) is positioned at the cutout (36). When the retainer member (32) is retained by the retainer recess (C1), the sliding portion (32$e$) moves from the cutout (36) to the guide portion (35$a$). When the retainer member (32) is pushed by the recording medium (M) inserted with a wrong orientation, the sliding portion (32$e$) moves from the cutout (36) to the relief guide portion (35$b$).

The recording medium driving device may further comprise a detecting means (21, SW1) and a drive source (M2). The detecting means is used for detecting that the retainer member (32) has been pushed either by a recording medium (M) inserted in a correct orientation or by a recording medium (M) inserted in a wrong orientation. The drive source (M2) is used to operate the drive member 16 in the drawing-in direction with the detection of the detecting means.

Although in the present invention the recording medium used was a disk D, or a mini-disk M, contained in a cartridge C, other types of recording media may also be used. They include a DVD or PD, or a magnetic disk, contained in the cartridge C. Recording media other than disks may also be used.

In the driving device, an ejection member (33) for ejecting a recording medium may be provided so as to move with the recording medium. An ejection mechanism may also be provided separately of the drawing-in member (32) and the drive mechanism, with the ejection mechanism used to eject the recording medium by pushing it out from the holder.

In the driving device, the guide portion (35*a*) and the relief guide portion (35) may be formed, for example, by two parallel grooves. The sliding portion (32*e*) of the drawing-in member (32) at the insertion waiting position is disposed at the division of both of the guide portions (grooves), and as the recording medium is being inserted the sliding portion (32*e*) slides either along the guide portion groove or the relief guide portion groove. Forming the inner surface of the guide plate (35) as the guide portion (35*a*) and the outer surface of the guide plate (35) as the relief guide portion (35*b*) allows both of the guide portions to be made thinner, thereby reducing the size of the driving device.

According to the present invention, the driving device is effective in preventing locking of a mechanism, when the driving device is one in which the drive member (16) drives the drawing-in member (32) in the drawing-in direction based on the output from the detecting member that has detected the insertion of the recording medium. The drive member (16) may be driven by an external switch after insertion of the recording medium.

DESCRIPTION OF THE PREFERRED EMBODIMENT

A description will now be given of a disk device as an embodiment of a driving device for a recording medium in accordance with the present invention, with reference to the drawings.

Figure 1:
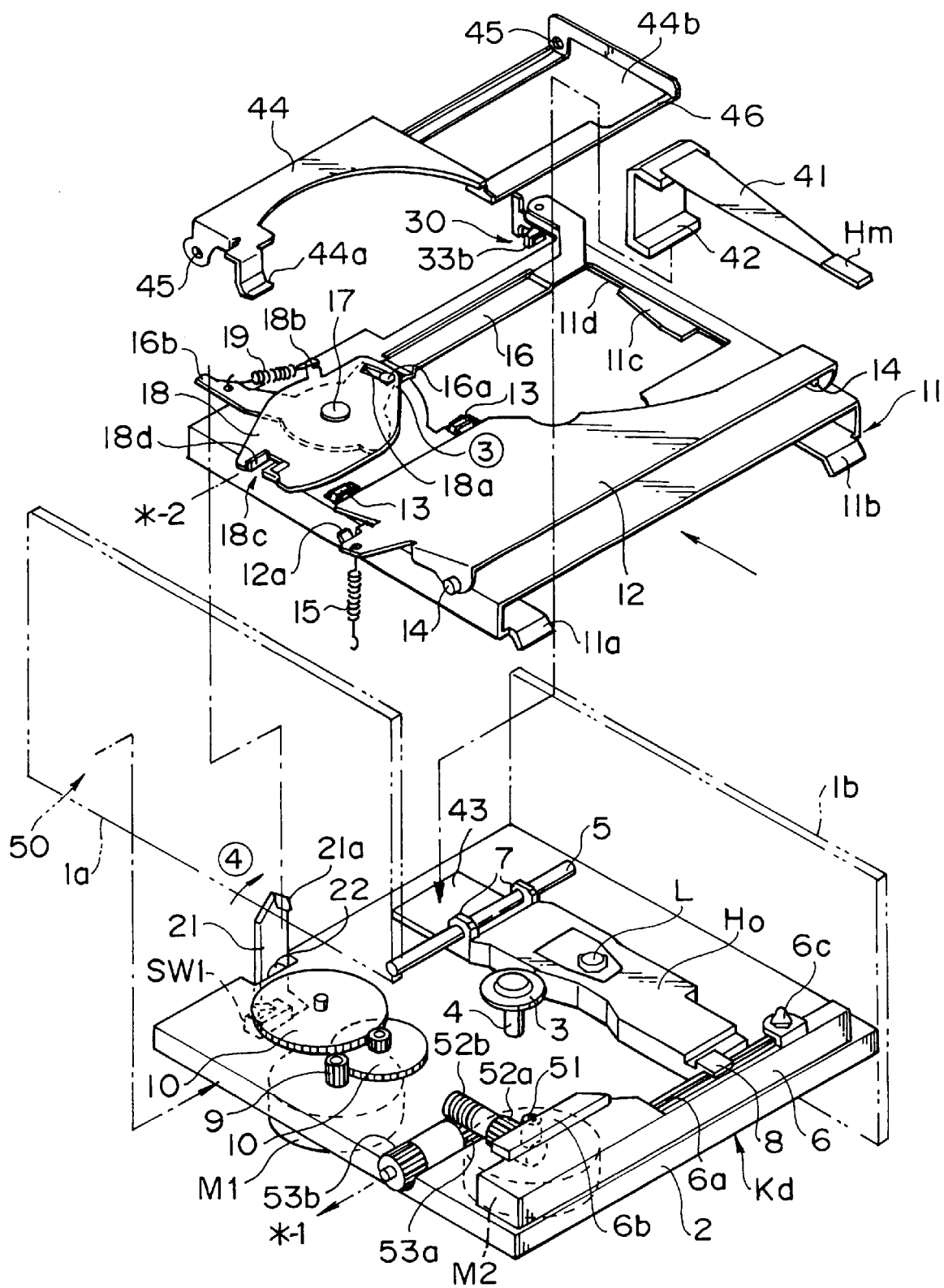
FIG. 1 is an exploded perspective view of a driving device for a recording medium in accordance with the present invention, with a disk device for a mini disk shown as an example thereof.
Figure 2:
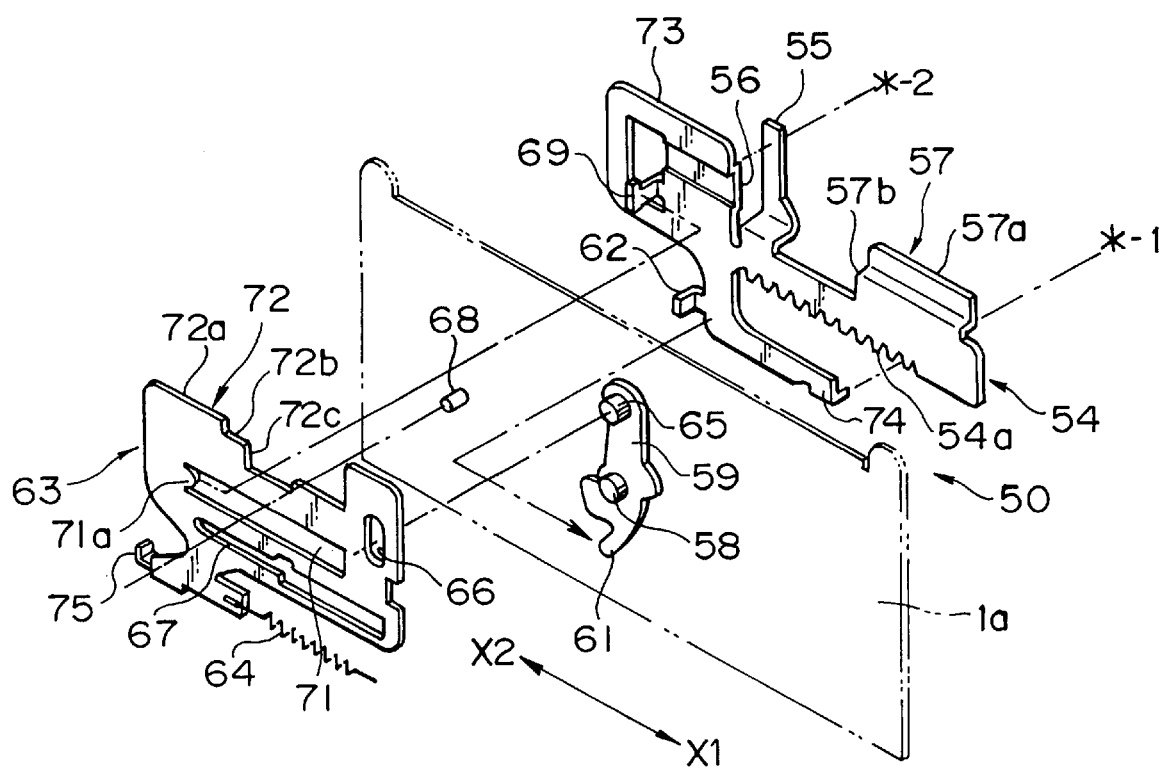
FIG. 2 is an exploded perspective view of a switching means of the disk device.
Figure 3:
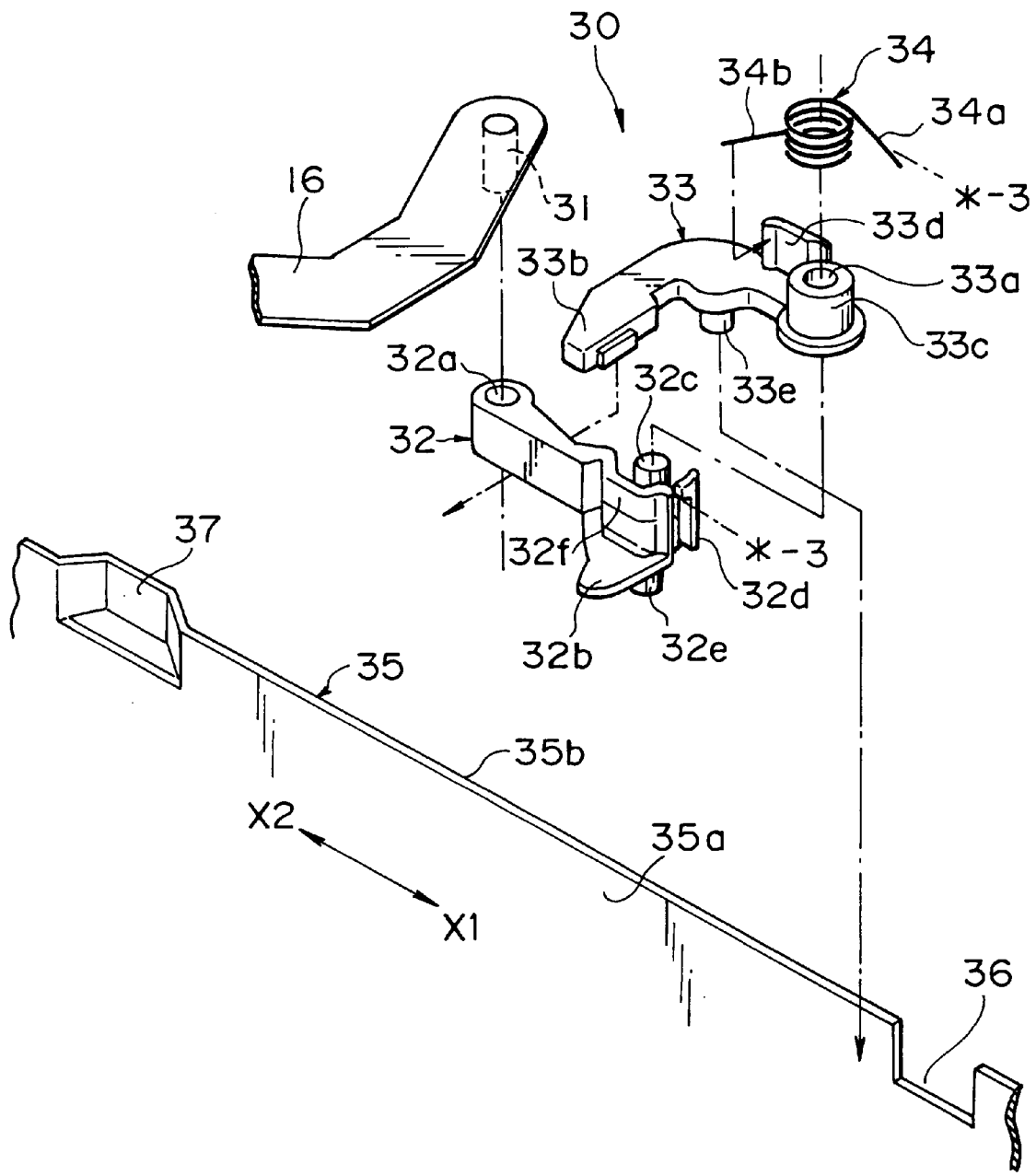
FIG. 3 is an exploded perspective view of a drawing-in/ejection mechanism of the disk device.

FIG. 1 is an exploded perspective view showing the main portion of a disc device. FIG. 2 is an exploded perspective view of a switching means. FIG. 3 is an exploded perspective view of a drawing-in/ejection mechanism.

Figure 4:
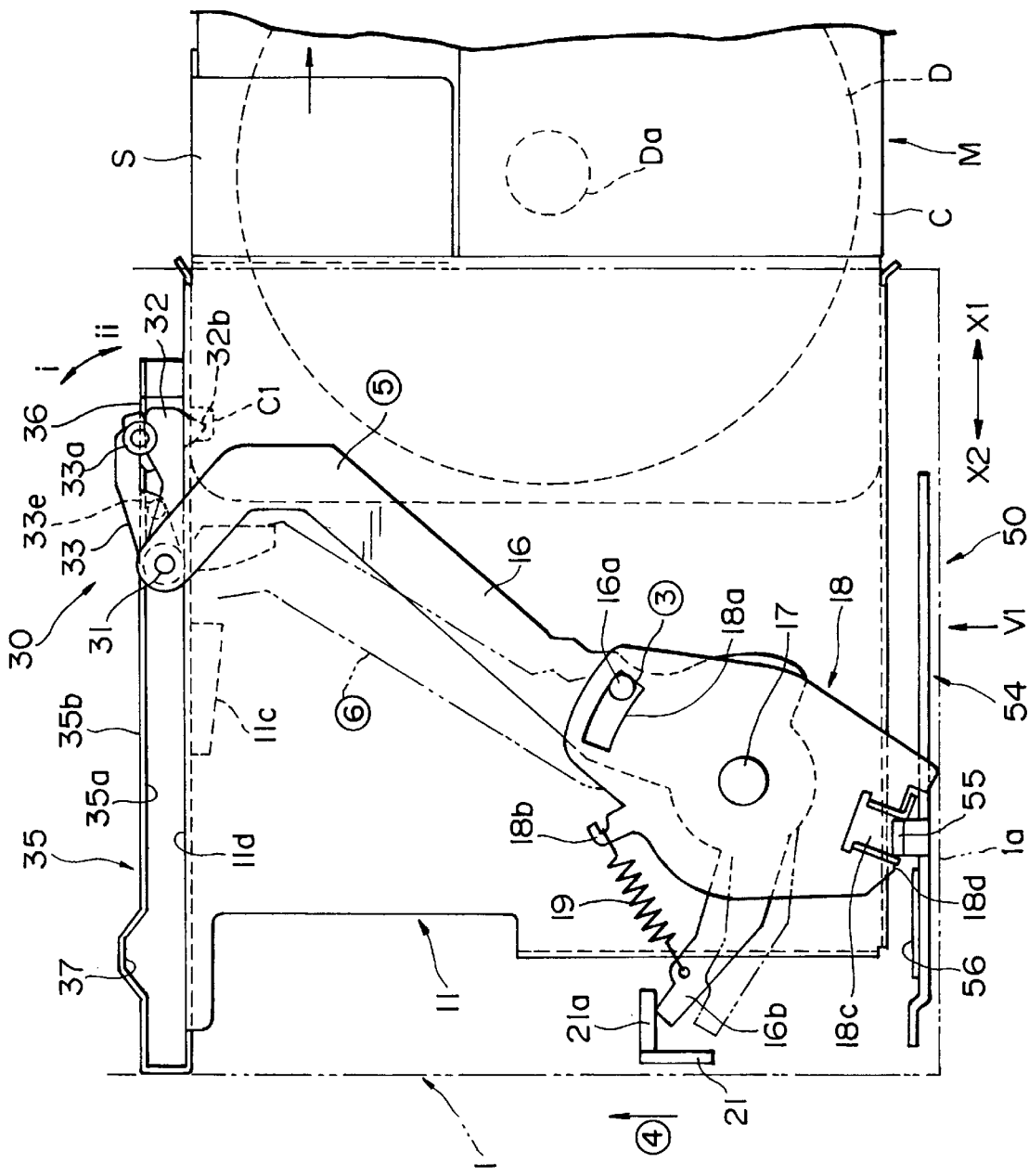
FIG. 4 is a plan view of the disk device during insertion of a disk.
Figure 5:
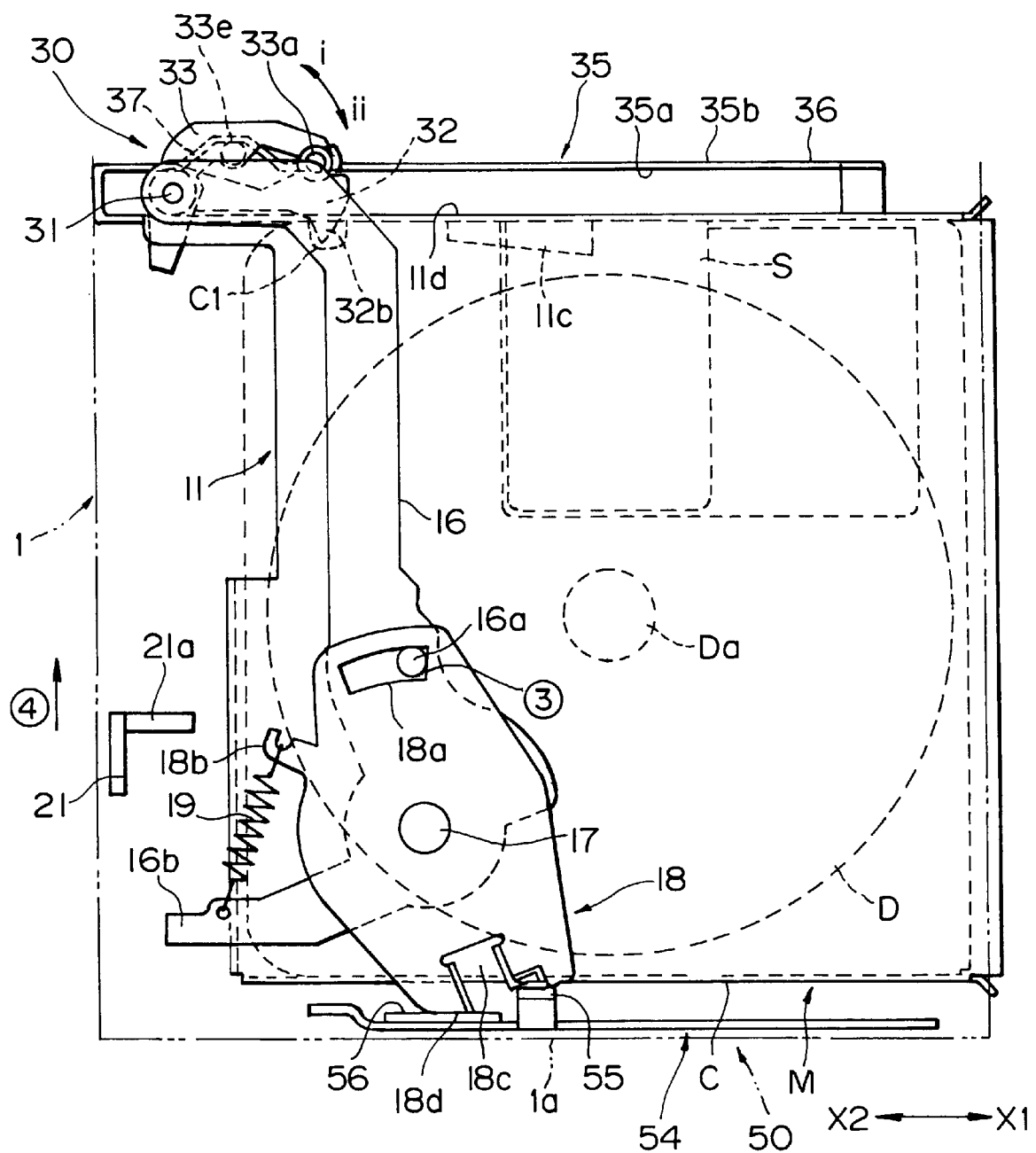
FIG. 5 is a plan view of the disk device in a disk drawing-in completion mode, in a reproduction mode, and in a recording mode.

FIGS. 4 and 5 are each a plan view of a disk device, with FIG. 4 showing the disk device after insertion of a cartridge, and FIG. 5 showing the disk device in a cartridge drawing-in completion mode, in a reproduction mode, and in a recording mode.

Figure 6:
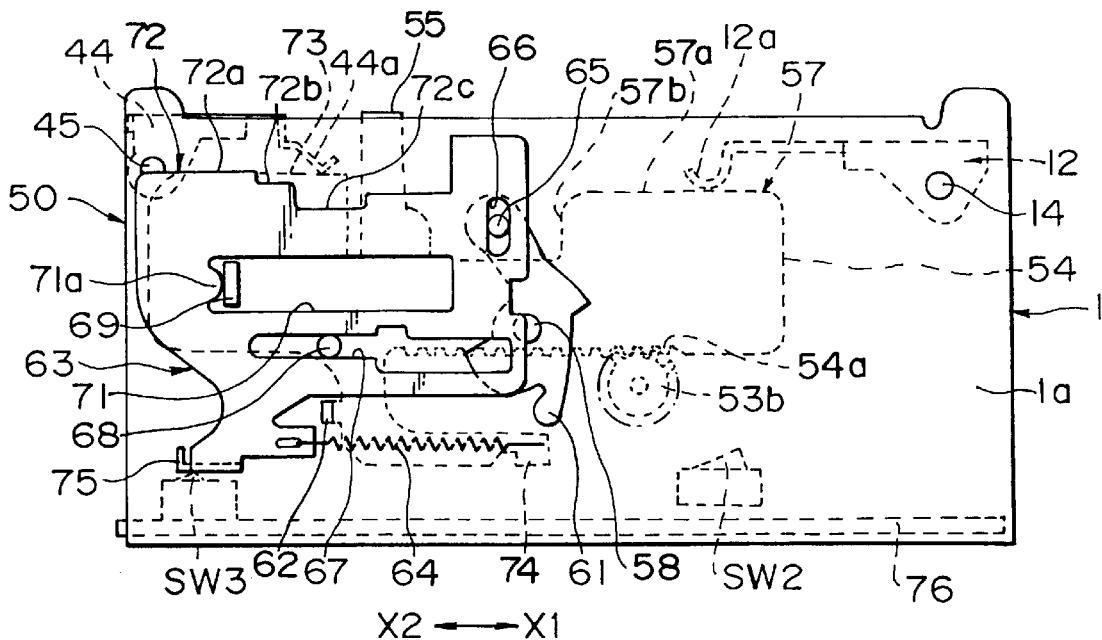
FIG. 6 is a side elevational view of the disk device in an insertion waiting mode, which is taken along the arrow VI of FIG. 4.
Figure 7:
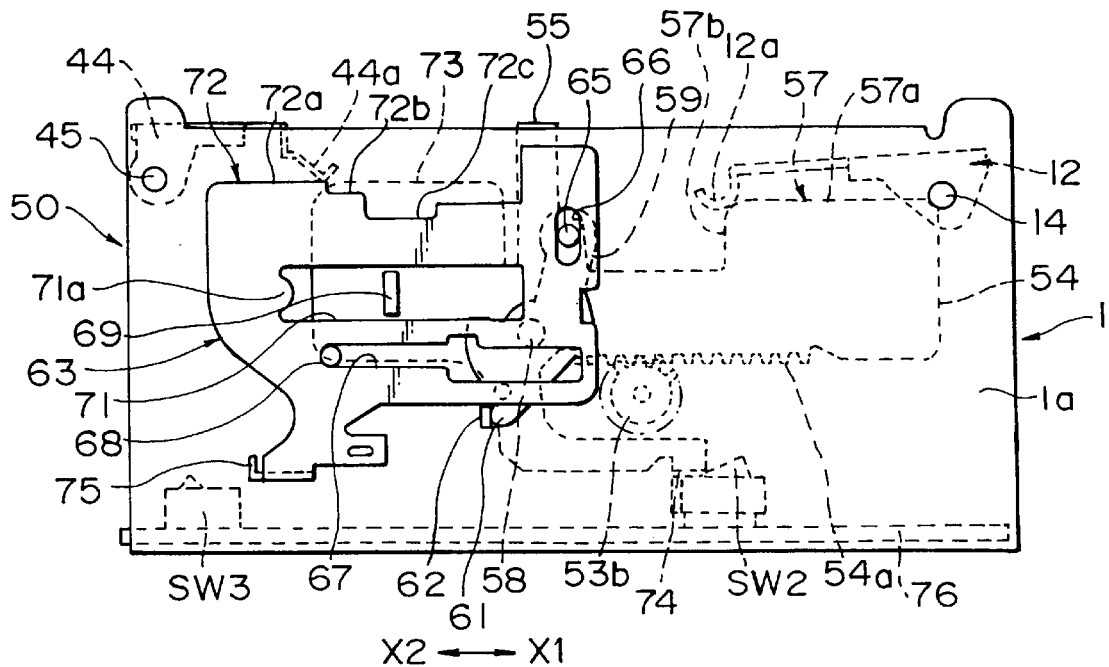
FIG. 7 is a side elevational view of the disk device upon completion of the drawing in of the cartridge.
Figure 8:
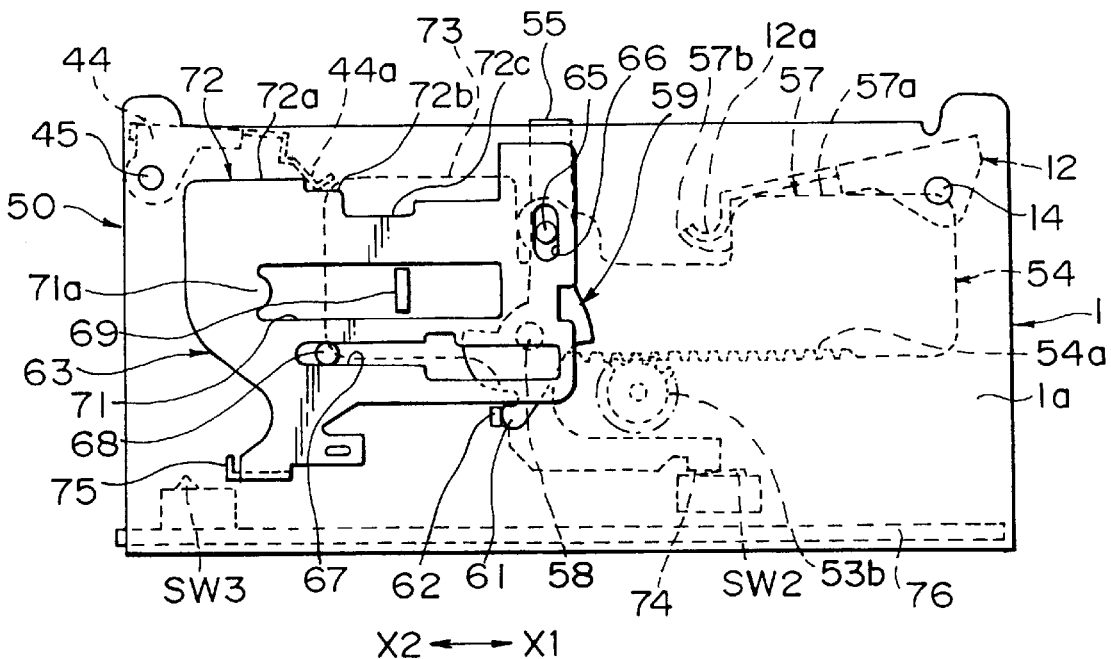
FIG. 8 is a side elevational view of the disk device in a reproduction mode.
Figure 9:
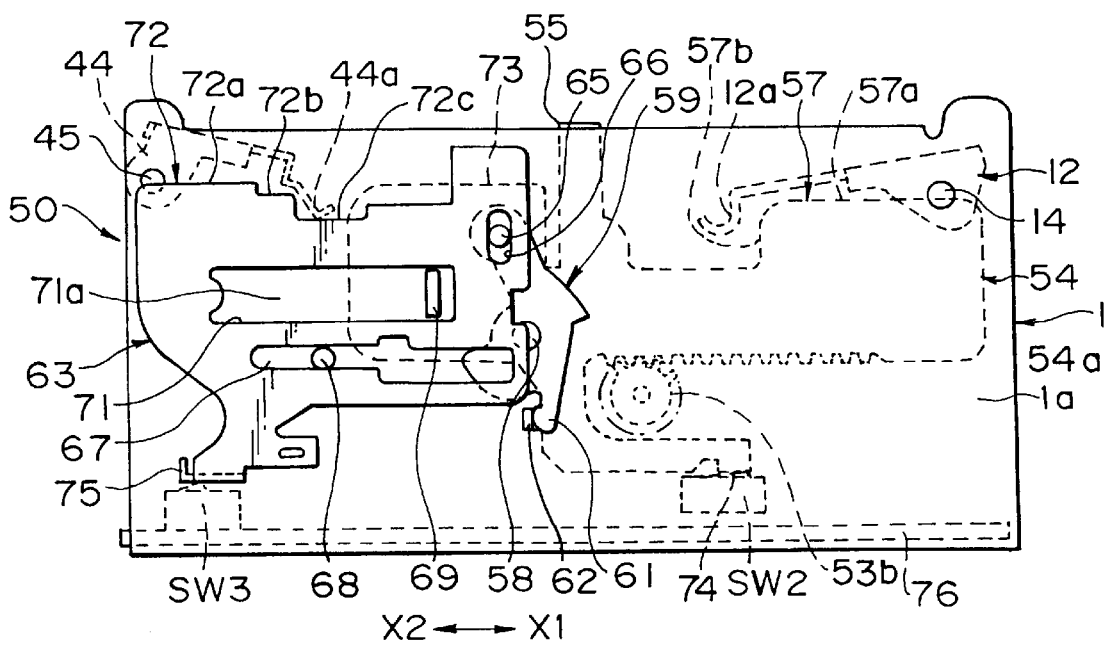
FIG. 9 is a side elevation view of the disk device in a recording mode.

FIGS. 6 to 9 are side elevational views showing the disk device as viewed from the VI direction. FIG. 6, which corresponds to FIG. 4, shows the disk device after insertion of a disk. FIG. 7 shows the disk device after the cartridge has been drawn into a cartridge holder. FIG. 8 shows the disk device in a reproduction mode, and FIG. 9 shows the disk device in a recording mode.

Figure 10:
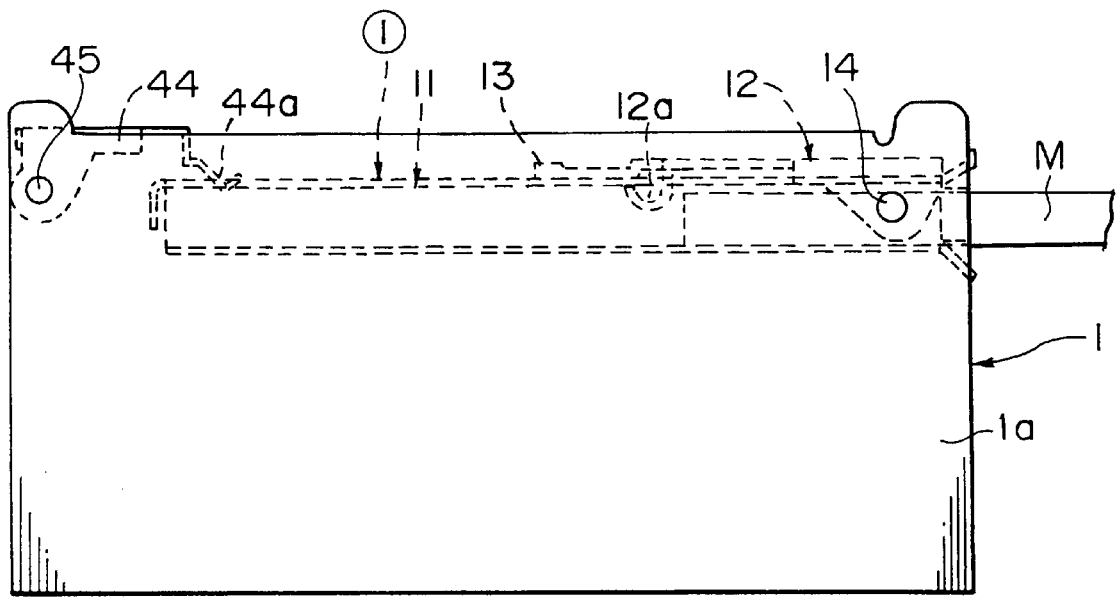
FIG. 10 is a side elevational view of the disk device when the cartridge holder is at the insertion position.
Figure 11:
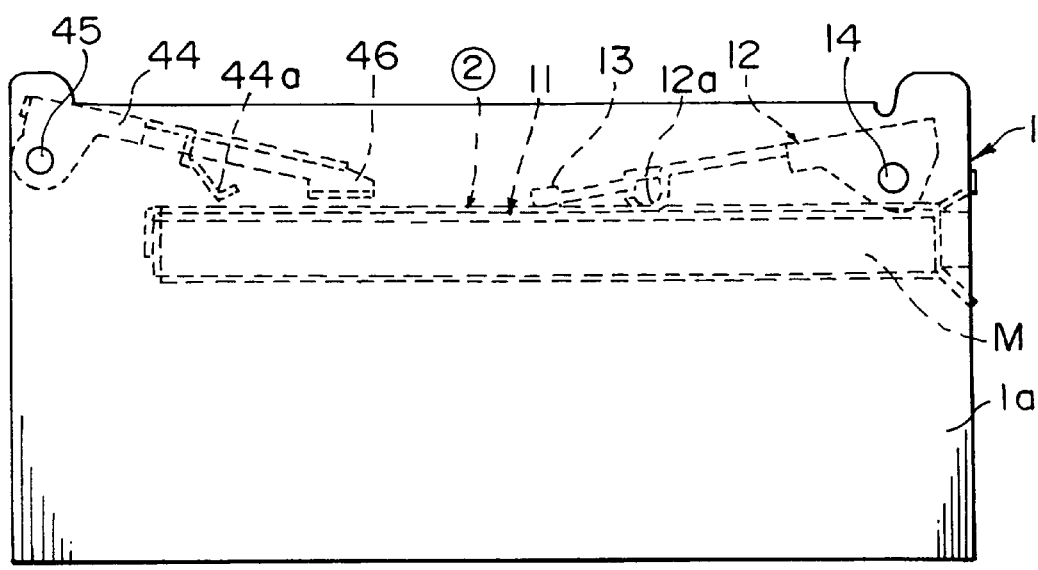
FIG. 11 is a side elevational view of the disk device when the cartridge holder is at a loading completion position.

FIGS. 10 and 11 are side elevational views showing the operating state of the cartridge holder. FIG. 10, which corresponds to FIG. 4, shows the disk device after insertion of the disk. FIG. 11, which corresponds to flu FIGS. 8 and 9, shows the disk device after loading of the disk.

Figure 12:
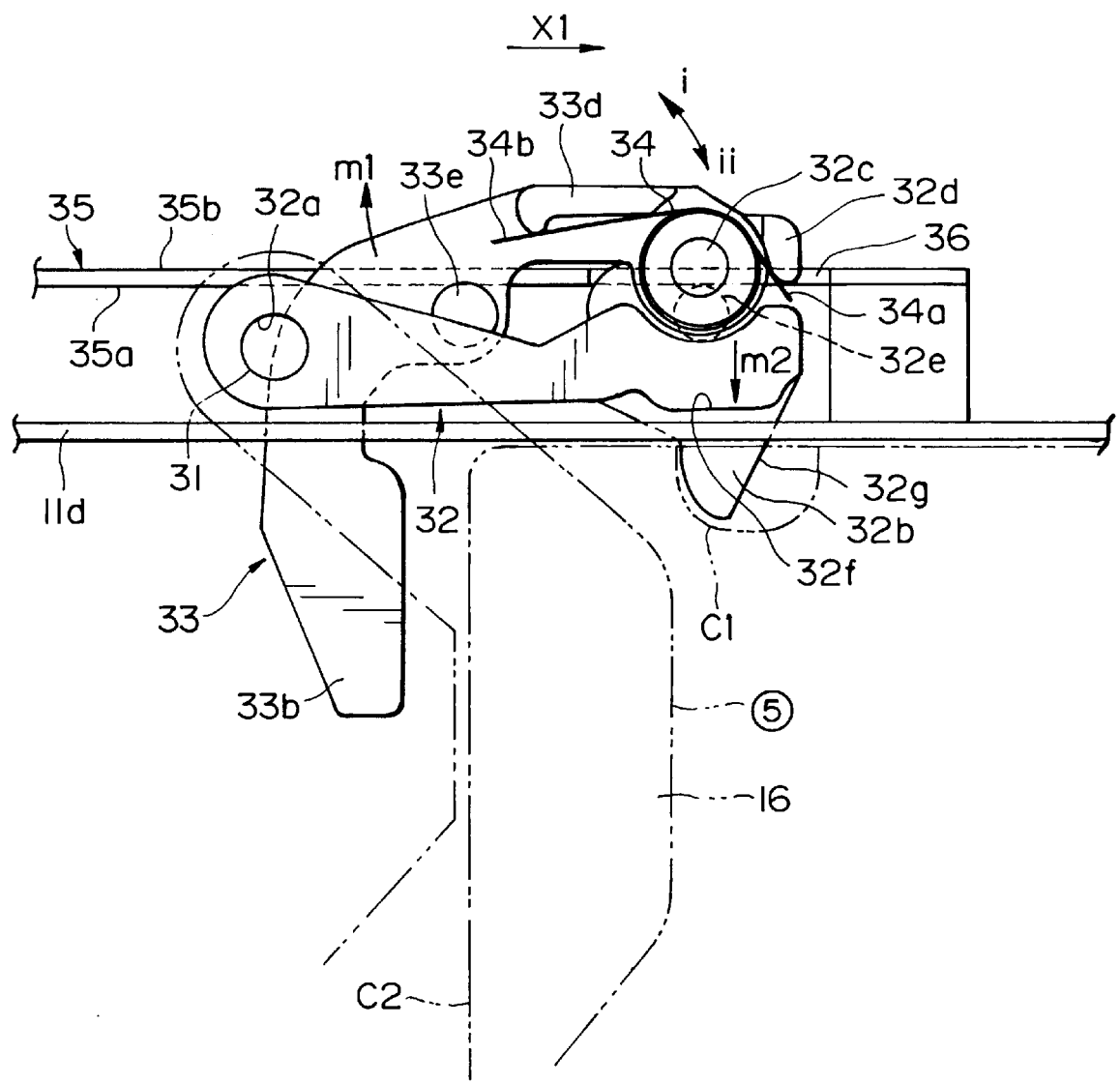
FIG. 12 is a plan view of a drawing-in/ejection mechanism at the cartridge insertion position.
Figure 13:
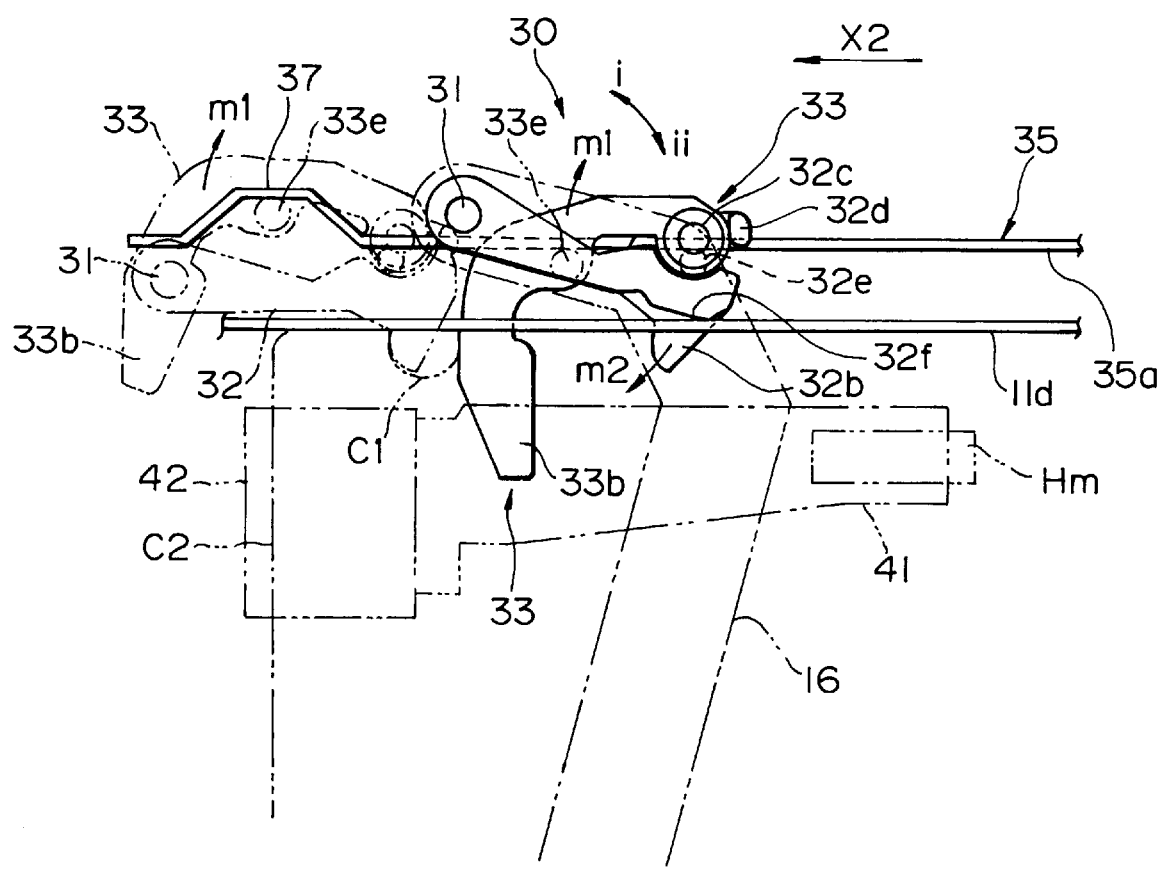
FIG. 13 is a plan view of the drawing-in/ejection mechanism at a cartridge drawing-in completion position.
Figure 14:
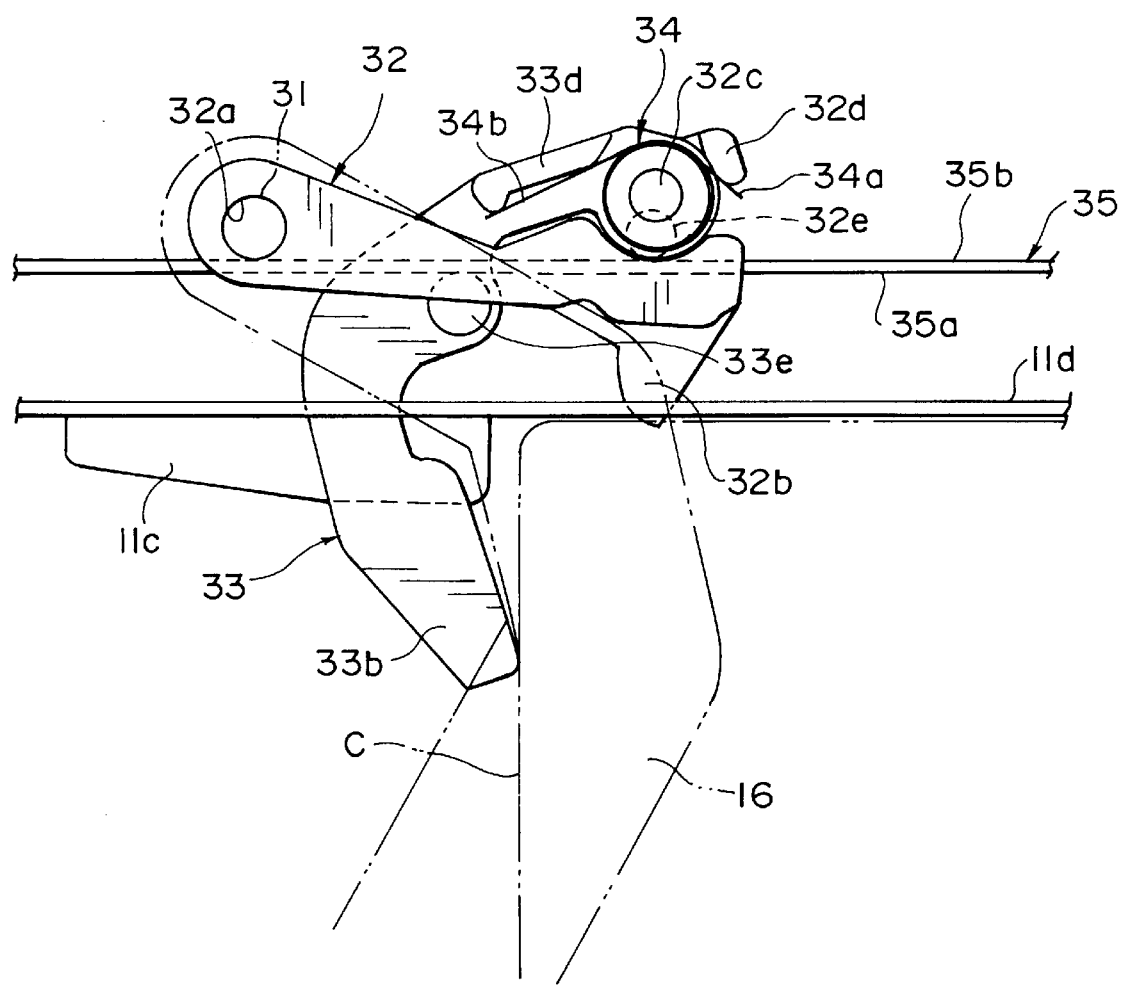
FIG. 14 is an enlarged plan view of the drawing-in/ejection mechanism in which the cartridge has been inserted from a wrong direction.

FIG. 12 is an enlarged plan view of a drawing-in/ejection mechanism in the condition shown in FIG. 4. FIG. 13 is an enlarged plan view of the drawing-in/ejection mechanism in the condition shown in FIG. 5. FIG. 14 is an enlarged plan view of the drawing-in/ejection mechanism after insertion of the cartridge from a wrong direction.

Figure 15:
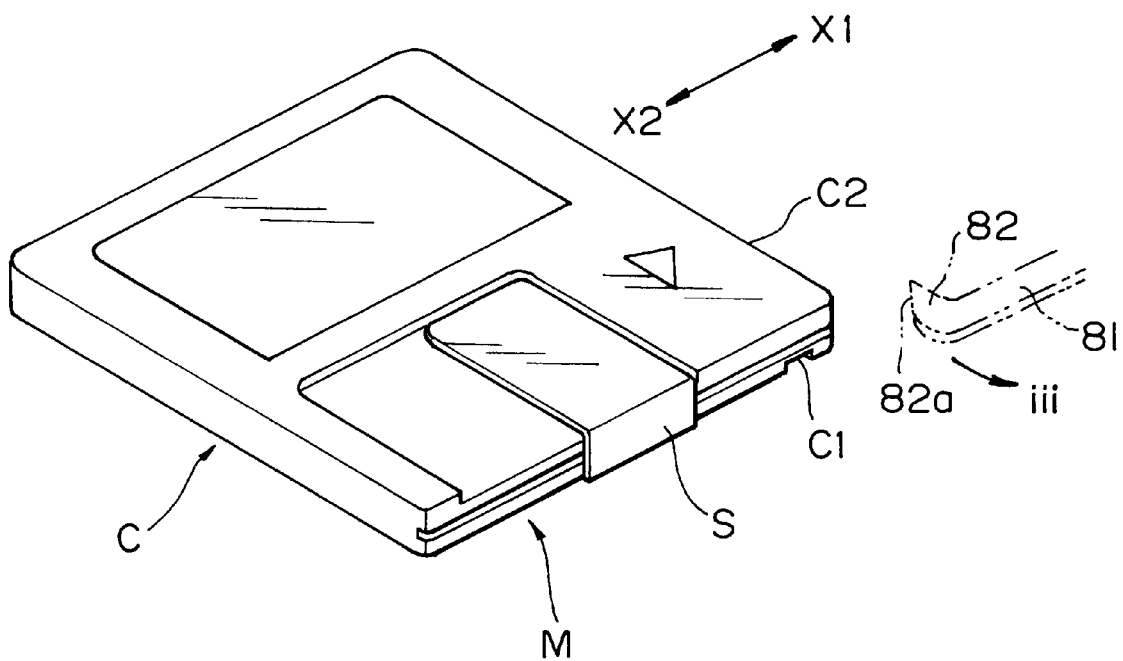
FIG. 15 is a perspective view of a mini-disk taken as an example of a recording medium.

FIG. 15 is a perspective view in which a mini-disk M taken as an example of a recording medium to be loaded into the disk device of the present invention is inserted in a slanting direction from the right.

The mini-disk M shown in FIGS. 4 and 15 is used as the recording medium to be loaded into the disk device. A magneto-optic recording type disk D is contained in a cartridge C that is a hard case being virtually square-shaped in a plane. A center (clamp) hole D*a* of the disk D, which is exposed, is formed at the bottom surface of the cartridge C. A shutter S is slidably provided at a side portion of the cartridge C. When the shutter S U slides in the direction of the arrow of FIG. 4, a window of the cartridge C appears. In a mini-disk M designed specially for reproduction, a window appears only at the bottom surface of the cartridge. An objective lens L of an optical head H*o* opposes the disk in the cartridge C through the window.

In a mini-disk M capable of allowing recording, when the shutter S slides, both of the windows at the top and bottom surfaces of the cartridge C appear, causing the interior disk D to be exposed from these windows. When recording is performed by the disk device, the objective lens L of the optical head H*o* of FIG. 1 opposes the bottom window of the cartridge C, while a magnetic head H*m* of FIG. 1 contacts the top surface of the disk D through the upper window of the cartridge C.

As shown in FIGS. 4 and 6, the disk device has a box-shaped housing 1. In FIG. 4, the planar shape of the housing 1 is represented by alternate short and long dashed lines. In FIG. 1, only a left plate 1a and a right plate 1b of the housing 1 are shown. The top and bottom plates are not shown.

As shown in FIG. 1, a drive base 2 forming a disk drive portion Kd is affixed in the housing at about halfway up the housing 1 in the vertical direction. A clamp table 3 is provided above the drive base 2, and a spindle shaft 4 formed integrally with the clamp table 3 is rotatably supported at the drive base 2. A spindle motor (not shown) that rotationally drives the spindle shaft 4 is provided at the bottom surface of the drive base 2.

A guide shaft 5 is provided above the drive base 2. A guide rail 6a is integrally formed in a block 6 formed on the drive base 2. Bearings 7 formed at one end of the optical head Ho is slidably supported at the guide shaft 5. A sliding portion 8 at the other end of the optical head Ho slidably engages the guide rail 6a. The optical head Ho is movable in the radial direction of the disk D clamped on the clamp table 3. A sled motor M1 is provided at the bottom surface of the drive base 2, the output shaft of which protrudes above the top surface of the drive base 2. At the top surface of the drive base 2, a pinion gear 9 is affixed to the output shaft. A reduction gear train 10 driven by the pinion gear 9 is provided at the top surface of the drive base 2. The motive power of the gear train 10 is transmitted to, for example, a rack (not shown) integrally provided with the optical head Ho which is reciprocally driven along the guide shaft 5 and the guide rail 6a.

A supporting surface 6b for supporting the bottom surface of a loaded cartridge C is formed at the top surface of the block 6. A positioning pin 6c for fitting into a positioning hole formed in the cartridge C is integrally formed with the top surface of the block 6.

A cartridge holder 11 is formed above the disk drive portion Kd, and is formed by bending a sheet metal. It has a guide portion 11a and 11b at the left and right side portions thereof. A shutter opening member 11c is integrally formed inwardly of the guide portion 11b in order to slide the shutter S of the mini-disk.

A holder supporting member 12 is formed above the cartridge holder 11, one end of which engages linking portions 13 on the top surface of the cartridge holder 11. These linking portions 13 rotatably link the cartridge holder 11 and the holder supporting member 12. Shafts 14 are provided at the left and right rotatable portions of the holder supporting members 12, and are rotatably supported by both side plates 1a and 1b of the housing 1.

As shown in FIG. 10, when the holder supporting member 12 is horizontal, the cartridge holder 11 is lifted upward by the drive base 2 at insertion position (1). On the other hand, as shown in FIG. 11, when the holder supporting member 12 rotates counterclockwise, the cartridge holder 11 moves downward to a loading completion position (2). The cartridge C, held in the cartridge holder 11, is loaded above the drive base of the disk drive portion Kd, and is positioned by the supporting surface 6b and the positioning pin 6c. The holder supporting member 12 is biased toward the direction of the loading completion position (2) (or the direction of the drive base 2) by a spring 15 serving as a biasing member. At a side portion of the holder supporting member 12 is integrally formed a lifting portion 12a for lifting the holder supporting member 12 and the cartridge holder 11 to the cartridge insertion position (1) of FIG. 10.

At the top surface of the cartridge holder 11 is provided a drawing-in/ejection arm 16 rotatably supported at a shaft 17. A drawing-in/ejection mechanism 30 is mounted to an end of the drawing-in/ejection arm 16. In other words, the drawing-in/ejection arm 16 operates as a drive member for reciprocating the drawing-in/ejection mechanism 30. An arm differential member 18 is placed on the drawing-in/ejection arm 16, and is rotatably supported by the same shaft 17 that supports the drawing-in/ejection arm 16. The arm differential member 18 includes a differential hole 18a formed with a predetermined angular length so as to be arc-shaped with the shaft 17 as center. A differential protrusion 16a of the drawing-in/ejection arm 16 is inserted into the differential hole 18a.

A detecting piece 16b is integrally formed with the drawing-in/ejection arm 16, and a spring securing piece 18b is integrally formed with the arm differential member 18. A linking spring 19 is placed between the detecting piece 16b and the spring securing piece 18b. The contraction force of the linking spring 19 biases the drawing-in/ejection arm 16 clockwise with respect to the arm differential member 18, so that the differential projection 16a is maintained in contact with an end (3) in the clockwise direction of the differential hole 18a. A drive groove 18c is formed in the arm differential member 18. Raised pieces are formed at both sides of the drive groove 18c. A regulating portion 18d is formed adjacent to the drive groove 18c.

At the drive base 2 is provided an insertion detection arm 21 rotatably supported by a shaft 22. A first switch SW1 is provided below the drive base 2 so as to be operated by the insertion detection arm 21. A protrusion 21a at the upper end of the insertion detection arm 21 can engage the detecting piece 16b of the drawing-in/ejection arm 16.

As shown in FIG. 4, when the drawing-in/ejection arm 16 rotates clockwise to the largest extent possible and arrives at an insertion waiting position (5) of the cartridge C, the insertion detection arm 21 is pushed in direction (4) by the detecting piece 16b, and the switch SW1 is turned on by means of the lower end of the insertion detection arm 21. When the cartridge C is inserted into the cartridge 11, the inserting force thereof causes the drawing-in/ejection arm 16 to rotate to position (6). While the arm 16 is rotating to position (6), the pushing force on the detecting piece 16b with respect to the insertion detection arm 21 is removed. By the internal opposing force of the SW1 or by means of a spring (not shown) that biases the insertion detection arm 21, the insertion detection arm 21 rotates in a direction opposite-to direction (4), thereby switching off the switch SW1. When the switch SW1 is turned off, a mode switching motor M2 starts to operate, which starts to draw in the cartridge C.

FIG. 3 shows the drawing-in/ejection mechanism 30 provided at an end of the drawing-in/ejection arm 16.

In the drawing-in/ejection mechanism 30, a supporting shaft 31 is affixed to an end of the drawing-in/ejection arm 16, and a portion with a supporting hole 32a in the base of a drawing-in member 32 is rotatably supported by the supporting shaft 31. A retainer protrusion (pawl) 32b is integrally formed with the drawing-in member 32. As shown in FIGS. 4 and 12, the retainer protrusion 32b projects inwardly from the lower end of a side plate 11d of the cartridge holder 11 so as to be retainable in a retainer recess C1 formed in the front side face of the cartridge C.

A linking shaft 32c is integrally formed with the front top surface of the drawing-in member 32. A portion with a linking hole 33a in the base of an ejection portion 33 is rotatably supported at the linking shaft 32c. The pusher ejection portion 33b extends below the drawing-in member 32 and the side plate 11d so as to protrude in the cartridge holder 11.

A torsion coil spring 34 is formed externally around a boss 33c in which the linking hole 33a of the ejection member 33 is formed. One of the arms 34a of the spring 34 is secured to a spring securing portion 32d of the drawing-in member 32, while the other arm 34b of the spring 34 is secured to a spring securing portion 33d of the ejection member 33. By the resilient force of the spring, the drawing-in member 32 and the ejection member 33 are biased so as to open apart with the linking shaft 32c as fulcrum.

As shown in FIG. 12, at the bottom surface of the drawing-member 32 is integrally formed a first sliding shaft 32e at a location slightly decentered from the linking shaft 32c. At the middle bottom surface of the ejection member 33 is formed a second sliding shaft 33e. As shown in FIG. 4, a guide plate 35 is integrally formed at the exterior side of one of the slide plates 11d of the cartridge holder 11, and is connected to the cartridge holder 11. As shown in FIG. 3, the inner surface of the guide plate 35 that faces the cartridge holder 11 is a guide surface (portion) for sliding the aforementioned sliding shafts 32e and 33e therealong. As shown in FIG. 14, when the cartridge 11 has been inserted with a wrong orientation, the outer surface of the guide plate 35 serves as a relief guide surface 35b for sliding the first sliding shaft 32e.

A cutout 36 in the guide surface 35a and the relief guide surface 35b is formed in an X1 side end of the guide plate 35. On the other hand, a recess 37 is integrally formed with an X2 side end (or with the end toward which the cartridge is inserted).

FIG. 12 is an enlarged view of a portion of FIG. 4. The drawing-in/ejection arm 16 is at the insertion waiting position (5), the first sliding shaft 32e of the drawing-in/ejection mechanism 30 is positioned in the cutout 36 of the guide plate 35, and the second sliding shaft 32e contacts the guide surface 35 of the guide plate 35. The torsion coil spring 34 biases the drawing-in member 32 and the ejection member 33 so as to open apart with the linking shaft 32c as fulcrum. In the condition shown in FIG. 12, by the resilient force thereof, there is exerted on the ejection member 33 a moment in an m1 direction with the linking shaft 32c as fulcrum. A reaction force thereof with the second sliding shaft 33e as fulcrum is exerted, so that a moment in an M2 direction with the supporting shaft 31 as center acts on the linking shaft 32c and the drawing-in member 32. As a result of this, the sliding surface 32f of the drawing-in member 32 is resiliently pushed toward the exterior surface of the drawing-in member 32. The retainer protrusion 32b extending below the sliding surface 32f protrudes into the cartridge holder 11 from the lower side of the side plate 11d so as to be resiliently retainable by the retainer recess C1 of the cartridge C.

As shown by the solid lines of FIG. 13, when the first sliding shaft 32e and the second sliding shaft 33e both contact the guide surface 35a of the guide plate 35, the moment in the m1 direction causes the second sliding shaft 33e to slide while it is resiliently pressed against the guide surface 35a. Here, the retainer protrusion 32b of the drawing-in member 32 is subjected to a force in direction (i) from the X2 direction side of the retainer recess C1 of the cartridge C. It is to be noted that the first sliding shaft 32e of the drawing-in member 32 can be received by and slide along the guide surface 35a in order to prevent the retainer protrusion 32b from moving out the retainer recess C1. Therefore, while being restricted by the side plate 11d and the guide plate 35, the driving-in/ejection mechanism 30 moves in the X1-X2 directions in accordance with the rotational movement of the drivingin/ejection arm 16.

As shown by the alternate long and two short dashed lines, when the driving-in/ejection mechanism 30 moves toward a terminal end in the X2 direction, and the second sliding shaft 33e arrives at the recess 37 in the guide surface 33, the moment m1 causes the second sliding shaft 33e to move into the recess 37. The ejection member 33 rotates clockwise, and the ejection portion 33b disposed within the cartridge holder 11 moves to a side thereof.

As shown in FIG. 1, the magnetic head Hm is supported by a plate spring 41 that is affixed to the upper end of a head base 42. The head base 42 is affixed to a moving base 43 that moves along with the optical head Ho. Therefore, the optical head Ho and the magnetic head Hm move together along the guide shaft 5 and the guide rail 6a. In addition, the magnetic head Hm is biased downward toward the optical head Ho by the plate spring 41.

As shown in FIG. 1, a magnetic head elevating-and-lowering member 44 is formed above the cartridge holder 11. Supporting holes 45 at both ends of the magnetic head elevating-and-lowering member 44 are rotatably supported at the right plate 1a and the left plate 1b of the housing 1. The head base 42 can move in the axial direction of the guide shaft 5 within a window 44b of the magnetic head elevating-and-lower member 44. The plate spring 41 is placed on a sliding portion 46 of the magnetic head elevating-and-lowering member 44. Thus, by the resilient force of the plate spring 41, the magnetic head elevating-and-lower member 44 is biased clockwise with the supporting holes 45 as centers.

A mode switching means 50 is provided at the left plate 1a of the housing 1. By the motive power of the mode switch motor M2, the switching means 50 sets operational modes to control the positions of the drawing-in/ejection arm 16, the cartridge holder 11, and the magnetic head elevating-and-lowering member 44.

As shown in FIG. 1, a worm gear 51 is affixed to the output shaft of the mode switching motor M2 disposed below the drive base 2, and engages a worm wheel 52a. A worm gear 52b is integrally formed with the worm wheel 52a. A pinion gear 53b is integrally formed with a worm wheel 53a.

As shown in FIG. 2, a first switching lever 54 is supported at the inner side 1a of the housing 1 so as to be slidable in the horizontal(X1-X2) direction. A rack 54a is integrally formed with the first switching lever 54, and engages the pinion gear 53b, as shown in FIG. 6 or the like. The first switching lever 54 is driven in either the X1 or X2 directions by the motive power of the mode switching motor M2.

The first switching lever 54 includes an arm drive portion 55 extending vertically. As shown in FIG. 4, the drive portion 55 is inserted into the drive groove 18c formed in the arm differential member 18. The first switching lever also has a restricting portion 56 protruding into the device and at a side of the arm drive portion 55 in the X2 direction. As shown in FIG. 5, when the first switching lever 54 moves in the X1 direction, the arm drive portion 55 drives the arm differential member 18 and the drawing-in/ejection arm 16 counterclockwise. When the arm drive portion 55 moves out from the drive groove 18c, the restricting portion 18d of the arm differential member 18 strikes the regulating portion 18d, and gets locked at a rotational angle of FIG. 5.

A holder control portion 57 is provided at the upper side of the first switching lever 54, and has a sliding portion 57a and a recess 57b adjacent thereto. As shown in FIG. 6, when the lifting portion 12a of the holder supporting member 12 is on the sliding portion 57a, the cartridge holder 11 is lifted up to the cartridge insertion position (1), as shown in FIG. 10. When the first switching lever 54 moves in the X1 direction so that the lifting portion 12a reaches the recess 57b, the resilient force of the spring 15 causes the cartridge holder 11 to move down to the loading completion position (2), as shown in FIG. 11.

As shown in FIG. 2, a shaft 58 is affixed to the outside surface of the left plate 1a, with a reversal link rotatably supported at the shaft 58. The first switching lever 54 has a pusher portion 62 formed by bending and passing through, for example, a slot in the left plate 1a to the outer side of the left plate 1a. When the first switching lever 54 moves in the X1 direction, and the pusher portion 62 pushes a portion 61 to be pushed at the lower end of the reversal link 59, the reversal link 59 rotates counterclockwise.

A second switching lever 63 is provided similarly at the outer side of the left plate 1a, and is supported by the left plate 1a so as to be slidable in the X1-X2 direction. A drive spring 64 is secured between the second switching lever 63 and the left plate 1a. The resilient force of the drive spring 64 biases the second switching lever 63 in the X1 direction. A reversal drive shaft 65 is affixed to the upper side of the reversal link 59, and is inserted into a slot 66 extending vertically in the second switching lever 63.

A guide slit 67 is formed in the second switching lever 63 so as to extend in the X1-X2 direction. A guide stopper 68 affixed to the left plate 1a is inserted in the guide slit 67. As shown in FIG. 7, the second switching lever 63 moves in the X1 direction. With the X2 side end of the guide slit 67 in contact with the guide stopper 68, the movement of the second switching lever 63 in the X1 direction is restricted.

The second switching lever 63 includes a slit 71 extending in the X1-X2 direction. A contact portion 69 formed by bending a portion of the first switching lever 54 passes through, for example, a slot in the left plate 1a to the outer side of the left plate 1a, and through the slit 71. As shown in FIG. 6, when the second switching lever 63 moves to a terminal end in the X2 direction, so that the contact portion 69 of the first switching lever 54 pushes a contact portion 71a at the X2 side end of the slit 71, the first switching lever 54 causes the second switching lever 63 to be pushed and moved in the X2 direction.

A magnetic head control portion 72 is formed at the upper side of the second switching lever 63. The control portion 72 includes a first sliding portion step 72a, a second sliding portion step 72b which is slightly lower in height than the height of the first sliding portion step 72a, and a recess 72c. A sliding portion 73 that functions with the magnetic head control portion is also formed at the X2 top side of the first switching lever 54. As shown in FIG. 6, the first sliding portion step 72a and the sliding portion 73 are about the same height so as to lie virtually on the same straight line.

As shown in FIG. 6, an elevating portion 44a of the magnetic head elevating-and-lowering member 44 is disposed on the sliding portion 73 of the first switching lever 54. As shown in FIG. 7, when the elevating portion 44a is disposed on the first sliding portion 72a of the second switching lever 63, the magnetic head elevating-and-lowering member 44 is in a horizontal position, so that the sliding portion 46 of the magnetic head elevating-and-lowering member 44 elevates the plate spring 41 and the magnetic head H*m*. As shown in FIG. 8, when the elevating portion 44a is on the second sliding portion step 72b, the second switching lever 63 rotates slightly in a clockwise direction, so that the magnetic head H*m* is slightly separated from the disk D to thereby set a reproduction mode. As shown in FIG. 9, when the elevating portion 44a falls into the recess 72c, the magnetic head elevating-and-lowering member 44 rotates further in the clockwise direction, so that the magnetic head H*m* hits the top surface of the disk D to thereby set a recording mode.

As shown in FIG. 6, a circuit substrate 76 is disposed at the bottom portion of the housing 1. A second switch SW2 is provided at the X1 side on the circuit substrate 76 in order to detect the setting of the reproduction mode. The switch SW2 is operated by a detection portion 74 formed in the first switching lever 54. At the X2 side end of the circuit substrate 76 is provided a third switch SW3 for detecting the starting and ending of the operation of the mode switching means 50 from the motor M2 and the second switching lever 63. The second switching lever 63 includes a detecting portion 75 for operating the third switch SW3.

A description will now be given of the operation of the above-described disk device.

The motive power of the mode switching motor M2 of FIG. 1 is transmitted to the worm gear 51, the worm wheel 52a, the worm gear 52b, and then to the worm wheel 53a. At the pinion gear 53b, a lower speed output is produced for higher torque driving. Since the pinion gear 53b engages the rack 54a, the lower speed motive power output causes the first switching lever 54 to move in the X1-X2 directions at a lower speed.

At an electrical control portion, the mode switching motor M2 is controlled based on the detection operation of the switches SW1, SW2, and SW3.

The mode switching motor M2 starts to operate when the first switch S1 used for detecting insertion of the cartridge C is turned off. When the mode switching motor M2 operates, the first switching lever 54 of the mode switching means 50 moves in the X direction, during which the modes are successively switched from the insertion waiting mode to the disk cartridge drawing-in operation mode to the loading completion mode to the reproduction mode and to the recording mode.

When the reproduction mode is set, as shown in FIG. 8, after confirmation of the switching off of the third switch SW3, the motor M2 stops at the moment the second switch SW2 has been turned on. When the recording mode is set, as shown in FIG. 9, after the third switch SW3 has been turned off, the second switch SW2 turns on. When the third switch SW3 turns on again, the mode switching motor M2 stops.

(Insertion Waiting Mode)

FIGS. 4, 6, 10, and 12 illustrates the disk device in the insertion waiting mode.

In the insertion waiting mode, the first switching lever 54 moves in the X2 direction, as shown in FIG. 6. The contact portion 69 of the first switching lever 54 pushes the contact portion 71a of the second switching lever 63 in the X2 direction, causing the second switching lever 63 to move to the X2 side end. Here, the detection portion 75 of the second switching lever 63 causes the third switch SW3 to turn on.

Since the arm drive portion 55 of the first switching lever 54 moves into the drive groove 18c of the arm differential member 18, the arm drive portion 55 moving in the X2 direction causes the arm differential member 18 to rotate clockwise, as shown in FIG. 4. This causes the drawing-in/ejection arm 16 linked to the arm differential member 18 and the spring 19 to rotate clockwise to the insertion waiting position (5).

As shown in FIG. 12, the drawing-in/ejection mechanism 30 at an end of the drawing-in/ejection arm 16 moves toward the X1 side end of the guide plate 35 opposing the side plate 11d of the cartridge holder 11. Thus, the first sliding shaft 32e at the bottom surface of the drawing-in member 32 is positioned at the cutout portion 36 being a division between the guide surface 35a and the relief guide surface 35b. The second sliding shaft 33e at the bottom surface of the ejection member 33 is in contact with the guide surface 35a corresponding to the inside surface of the guide plate 35. By a moment ml produced by the torsion coil spring 34, the second sliding shaft 33e is resiliently pressed against the guide surface 35a. By a moment m2 produced by the reaction force thereof, the sliding surface 32f of the drawing-in member 32 is resiliently pressed against the side plate lid, and r the retainer protrusion 32b protrudes into the cartridge holder 11 from the bottom side of the side plate 11d.

As shown in FIG. 6, the lifting portion 12a is disposed on the sliding portion 57a of the holder control portion 57 of the first switching lever 54. As shown in FIG. 10, the holder supporting member 12 including the lifting portion 12a is substantially horizontal and lifted to the cartridge insertion position (1) above the drive base 2.

The elevating portion 44a is disposed on the sliding portion 73 serving as part of the magnetic head control portion of the first switching lever 54, so that the magnetic head elevating-and-lowering member 44 is substantially set horizontally. Thus, by the sliding portion 46 of the magnetic head elevating-and-lowering member 44, the plate spring 41 supporting the magnetic head Hm is elevated, so that the magnetic head Hm is elevated far above the optical head Ho.

(Cartridge Insertion Detection)

As shown in FIGS. 4 and 12, when the insertion side end of the cartridge C of the mini-disk M is inserted into the cartridge holder 11, the end C2 of the cartridge C hits the X2 side sloped surface 32g of the retainer protrusion 32b of the drawing-in member 32 of the drawing-in/ejection mechanism 30. The sloped surface 32g causes the drawing-in member 32 to be pushed once in direction (i). In the condition shown in FIGS. 4 and 12, the first sliding shaft 32e at the bottom surface of the drawing-in member 32 is positioned at the cutout 36 of the guide plate 35, so that a pushing force of a side of the cartridge C against the retainer protrusion 32b causes the drawing-in member 32 to rotate in direction (i) around the supporting shaft 31 as center. When the retainer recess C1 of the cartridge C opposes the retainer protrusion 32b, the moment m2 exerted by means of the torsion coil spring 34 causes the drawing-in member 32 to rotate in direction (ii), and thus the retainer protrusion 32b to be retained in the retainer recess C1 of the cartridge C.

When the cartridge C is pushed in the X2 direction in this condition, the drawing-in/ejection arm 16 rotates counterclockwise. Here, the arm differential member 18 is restricted by the arm drive portion 55 of the first switching lever 54, so that the differential protrusion 16a in the drawing-in/ejection arm 16 moves in the differential hole of the arm differential member 18, and the linking spring 19 stretches to rotate only the drawing-in/ejection arm 16 to the position (6) of FIG. 4. When the drawing-in/ejection arm 16 rotates counterclockwise, the detecting piece 16b moves away from the insertion detection arm 21, so that the insertion detection arm 21 which has been pushed in direction (4) up to this time starts to move in a direction opposite to direction (4). The bottom end of the insertion detection arm 21 moves away from the first switch SW1, turning off the first switch SW1.

When the first switch SW1 is set from the ON to the OFF position, the mode switching motor M2, which was not operating, starts to operate.

(Cartridge Drawing-In Operation)

When the first switch SW1 is turned off, and the mode switching motor M2 starts to operate, at the mode switching means 50, the rotational force of the pinion gear 53b of FIGS. 1 and 6 is transmitted to the rack 54a, causing the first switching lever 54 to be driven in the X1 direction. The second switching lever 63 is biased in the X1 direction by the drive spring 64. Therefore, in the initial stage in which the first switching lever 54 moves in the X1 direction from the position in the initial waiting mode of FIG. 6, the second switching lever 63 starts to move in the X1 direction therewith, with the contact portion 71a kept in contact with the contact portion 69.

When the first switching lever 54 moves in the X1 direction, the arm drive portion 55 causes the arm differential member 18 to be driven counterclockwise. The drawing-in/ejection arm 16 linked to the arm differential member 18 by the linking spring 18 starts to rotate counterclockwise. At this time, in the drawing-in/ejection mechanism 30 at an end of the drawing-in/ejection arm 16, the first sliding shaft 32e and the second sliding shaft arm 33e both slide in the X2 direction along the guide surface 35a corresponding to the inside surface of the guide plate 35. Since the first sliding shaft 32e slides along the guide surface 35a, the retainer protrusion 32b will reliably be retained in the retainer recess C1 of the cartridge C. Movement of the drawing-in/ejection mechanism in the X2 direction causes the cartridge C to be drawn in the cartridge holder 11 in the X2 direction.

When the cartridge C is being drawn into the cartridge holder 11 in the X2 direction, the front end of the shutter S of the cartridge C hits the shutter opening member 11c formed by inwardly bending a portion of the holder 11 from the side plate 11d of the holder 11. The relative movement of the cartridge C being drawn into the holder 11 in the X2 direction with respect to the shutter opening member 11c causes the shutter S to be opened, thereby opening the window of the cartridge C, and thus exposing the disk D.

FIG. 7 illustrates the condition of the disk device immediately after the cartridge C has been drawn in. In FIG. 7, the first switching lever 54 moves a predetermined distance in the X1 direction, and the second switching lever 63 moves a predetermined distance in the X1 direction (i)s a result of being pulled by the drive spring 64. However, the terminal end of the guide hole 67 in the second switching lever 63 strikes the guide stopper 68 affixed to the left plate 1a, thereby preventing further movement of the second switching lever 63 in the X1 direction. In the condition of FIG. 7, the elevating portion 44a which has been sliding on the sliding portion 73 of the first switching lever 54 moves onto the first slide portion step 72a of the magnetic head controlling portion 72 of the second switching lever 63. Thus, at the time the disk device is in the condition shown in FIG. 7, the magnetic head elevating-and-lowering member 44 is horizontal, so that the plate spring 41 of the magnetic head Hm remains considerably elevated.

During the time from the insertion waiting mode of FIG. 6 to the completion of the drawing in of the cartridge shown in FIG. 7, the lifting portion 12a of the holder supporting member 12 still slides on the sliding portion 57a of the first switching lever 54, so that the cartridge holder 11 remains lifted at the insertion position (1) of FIG. 10.

In the cartridge drawing-in operation, as shown in FIG. 5, the arm drive portion 55 of the first switching lever 54 causes the arm differential member 18 and the drawing-in/ejection arm 16 to rotate counterclockwise. After the cartridge C has been completely drawn into the terminal end in the X2 direction of the cartridge holder 11, the drawing-in/ejection mechanism 30 causes the arm drive portion 55 to move out from the drive groove 18c of the arm differential member 18 in the X1 direction, causing the restricting portion 56 of the first switching lever 54 to strike the regulating portion 18d of the arm differential member 18. As a result of this, the arm differential member 18 is locked, preventing rotating.

(Reproduction Mode)

When the reproduction mode is to be set, the first switching lever 54 is further driven in the X1 direction from its position in FIG. 7. As shown in FIG. 8, the second switch SW2 is turned on by means of the detecting portion 74 of the first switching lever 54, at which moment the mode switching motor M2 stops, causing the mode switching means 50 to stop moving to thereby complete the setting of the reproduction mode.

The pusher portion 62 of the first switching lever 54 is in contact with the portion 61 to be pushed of the reversal link 59, when the disk device is in the condition shown in FIG. 7. Therefore, during the time the first switching lever 54 moves from its position in FIG. 7 to the position in FIG. 8, the moving force of the first switching lever 54 in the X1 direction drives the reversal link 59 counterclockwise, so that the reversal drive shaft 65 of the reversal link 59 causes the second switching lever 63 to move in the reverse X2 direction.

In the condition of FIG. 8, the second switching lever 63 is moved slightly in the X2 direction than in the condition shown in FIG. 7. The lifting portion 12a of the holder supporting member 12a moves off the sliding portion 57a of the holder control portion 57 of the first switching lever 54 and into the recess 57b. Therefore, the holder supporting member 12 is no longer restricted. The resilient force of the spring 15 of FIG. 1 causes the holder supporting member 12 to rotate counterclockwise with the supporting shaft 14 as fulcrum, so that the cartridge holder 11 moves downward. The cartridge C in the cartridge holder 11 is positioned at the supporting surface 6b on the drive base 2 and the positioning pin 6c, thus completing the loading of the cartridge C. A center hole Da of the disk D in the cartridge is clamped on the clamp table above the drive base 2.

In FIG. 8, since the second switching lever 63 is moved in the X2 direction, the elevating portion 44a of the magnetic head elevating-and-lowering member 44 reaches the second sliding portion step 72b of the magnetic head control portion 72 of the second switching lever 63. Here, the magnetic head elevating-and-lowering member 44 is subjected to the resilient force of the plate spring 41, and rotates slightly clockwise from the horizontal position of FIG. 7. This causes the magnetic head Hm at an end of the plate spring 41 to move downward toward the cartridge C. The magnetic head Hm moves downward to a position that is slightly higher the top surface of the cartridge C, and stops there. For example, even when a cartridge C having a top surface designed specifically for reproduction that does not have a window is loaded, the magnetic head Hm is positioned so as not to touch the top surface of the cartridge C.

In the reproduction mode, the sled motor M1 provided at the drive base 2 of FIG. 1 starts to operate, causing the optical head Ho to be guided by the guide shaft 5 and the guide rail 6a. The shutter is opened, exposing the lower surface of the disk D onto which is irradiated a laser beam from the objective lens, whereby the recorded data on the disk D is reproduced (or read out). With the movement of the optical head Ho, the head base 42 integrally affixed thereto moves with it, so that the plate spring 41 supported by the head base 42 slides on the sliding portion 46 of the magnetic head elevating-and-lowering member 44. It is to be noted that since the magnetic head elevating-and-lower member 44 is rotated clockwise to a larger extent than the member 44 in the waiting state of FIGS. 4 and 6, so that the sliding portion 46 moves downward in the direction of the cartridge C, the plate spring supporting the magnetic head Hm resiliently presses against the sliding portion 46 with less force than the force with which it presses in the waiting mode. Accordingly, it is possible to use less load when moving the optical head Ho and the magnetic head Hm using the driving power of the sled motor M1. In addition, since the magnetic head Hm is moved downward and set in the waiting state, the distance that the magnetic head Hm needs to be moved downward to contact the disk D can be made shorter, when the mode is being changed to the recording mode.

In FIG. 13, the alternate long and two short dashed lines show the condition of the drawing-in/ejection mechanism 30, when the loading of the cartridge C has been completed and the mode is being changed to the reproduction mode and then to the recording mode. At the moment the loading of the cartridge C has been completed, the drawing-in/ejection mechanism 30 moves to the X2 side end of the guide plate 35. At this time, the first sliding shaft 32e of the drawing-in member 32 contacts the guide surface 35a corresponding to the inner side surface of the guide plate 35, so that the retainer protrusion 32b of the drawing-in member 32 remains retained in the retainer recess C1 of the cartridge C. Thus, the cartridge C is reliably drawn into the cartridge holder 11 to the X2 direction terminal end of the cartridge C.

The second sliding shaft 33e of the ejection member 33 moves into the recess 37 of the guide plate 35 as a result of the moment m1 exerted by means of the coil spring 34. Thus, the ejection member 33 rotates clockwise, so that as shown in FIG. 13 the pusher ejection portion 33b moves away from the insertion side end C1 of the cartridge C, and waits at the top portion of the figure (or toward the outer side of the device). In FIG. 13, dotted lines represent the positions that the magnetic head Hm, the plate spring 41, and the head base 42 occupy after they have moved to the radial outer periphery of the disk D. The recess 37 of the guide plate 35, causing considerable rotation of the pusher ejection portion 33b in the clockwise direction, prevents the pusher ejection portion 33b from coming into contact with the head base 42 or the like.

In other words, at the moment the cartridge C has been drawn into the cartridge holder 11 as shown in FIG. 7, the pusher ejection portion 33b is upwardly moved away from the insertion side front end C2 of the cartridge C, as shown in the figure. For this reason, in the reproduction mode or the recording mode thereafter, even when the optical head Ho and the head base 42 move along the front end C2 of the cartridge C to the position of FIG. 13, the pusher ejection portion 33b will not contact the head base 42, and interfere with the movement of the head base 42.

(Recording Mode)

When the recording mode is to be set, the first switching lever 54 moves further in the X1 direction from the position of FIG. 8. Thus, the pusher portion 62 of the first switching lever 54 causes counterclockwise rotation of the reversal link 59, so that the reversal drive shaft 65 causes the second switching lever 63 to be driven in the X2 direction. When the condition of FIG. 9 is realized, the detecting portion 75 of the second switching lever 63 turns on the third switch SW3 once again. The second switch SW2 is kept on by the detecting portion 74 of the second switching lever 63. In other words, in FIG. 9, the second switch SW2 as well as the third switch SW3 are turned on, so that at the electric control portion a judgement is made that the recording mode has been set, as a result of which the mode switching motor M2 stops.

In FIG. 9, the elevating portion 44a of the magnetic head elevating-and-lowering member 44 moves into and contacts the recess 72c of the magnetic head control portion 72 of the second switching lever 63. Thus, the magnetic head elevating-and-lowering portion 44 is further rotated clockwise, causing the sliding portion 46 of the magnetic head elevating-and-lowering member 44 to move downward toward the disk D. This causes the magnetic head H$m$ at an end of the plate spring 41 to move into the cartridge C from the window in the upper surface of the cartridge C, and come into contact with the top surface of the disk D as a result of the resilient force of the plate spring 41. The sliding portion 46 of the magnetic head elevating-and-lowering member 44 moves downwardly away from the plate spring 41.

The device must be set in the reproduction mode of FIG. 8 before being set in the recording mode, so that the magnetic head H$m$ moves completely downward in the recording mode, after it has been moved one step downward. Thus, the distance the magnetic head H$m$ must be moved downward to set the recording mode becomes shorter, thereby reducing the shock produced when the magnetic head H$m$ contacts the top surface of the disk D.

In the recording operation, the operation of the sled motor M1 moves the optical head H$o$ along with the magnetic head H$m$. The magnetic head H$m$ applies a magnetic field to the top surface of the disk D, while the objective lens L of the optical head H$o$ applies the energy of the laser beam to the bottom surface of the disk D, whereby data is recorded by light modulation or by magnetic modulation.

(Cartridge Ejection Operation)

When the mode is set in the reproduction mode of FIG. 8 or the recording mode of FIG. 9, and the cartridge C is to be ejected, the mode switching motor M2 starts to rotate in a direction opposite to the direction of operation of the motor M2 when the cartridge is to be loaded. The motive power thereof is transmitted from the pinion gear 53b to the rack 54a, causing the first switching lever 54 to be driven in the X2 direction. During the time in which the condition changes from that of FIG. 9 to that of FIG. 8, and that of FIG. 8 to that of FIG. 7, the first switching lever 54 moves back slightly in the X2 direction, so that the biasing force of the drive spring 64 is applied to the reversal link 59 through the second switching lever 63, causing the reversal link 59 to rotate clockwise. From the position of FIG. 7, the first switching lever 54 moves in the X2 direction. After the contact portion 69 contacts the contact portion 71a, the second switching lever 63 moves in the X2 direction (i)long with the first switching lever 54, and is restored back to the position of FIG. 6.

When the condition of FIG. 6 is restored, the detecting portion 75 of the second switching lever 63 turns on the third switch SW3. At this point, the cartridge C ejection completion mode is set, and the mode switching motor M2 stops.

In the above-described operations, first, during the time in which the mode is changed from the reproduction mode of FIG. 8 or the recording mode of FIG. 9 to the mode of FIG. 7, the elevating portion 44a of the magnetic head elevating-and-lowering member 44 moves on the first sliding portion step 72a of the second switching lever 63, so that the magnetic head elevating-and-lowering member 44 elevates the magnetic head H$m$. In addition, during this time, the lifting portion 12a of the holder supporting member 12 moves on the sliding portion 57a of the first switching lever 54, so that the cartridge holder 11 is lifted to the position of FIG. 10.

During the time in which the condition changes from the condition of FIG. 7 to that of the insertion waiting mode of FIG. 6, the arm drive portion 55 of the first switching lever 54 moves into the drive groove 18c to drive the arm differential member 18 as well as the drawing-in/ejection arm 16 in the clockwise direction. When the drawing-in/ejection arm 16 rotates clockwise, the drawing-in/ejection mechanism 30 indicated by alternate long and two short dashed lines in FIG. 13 moves in the X1 direction. Immediately after the movement, the second sliding shaft 33e moves out of the recess 37 to the guide surface 35a. The ejection member 33 rotates counterclockwise, so that the pusher ejection portion 33b can push the X2 side end of the cartridge C. Then, when the condition changes from that of FIG. 5 of that of FIG. 4, the pusher ejection portion 33b pushes out the cartridge C. The drawing-in/ejection arm 16 rotates completely to the waiting position (5) of FIG. 4. When the cartridge C has been ejected, the detecting piece 16b of the drawing-in/ejection arm 16 pushes the insertion detecting piece 21 in direction (4), thereby turning on the first switch SW1. The turning on of the first switch SW1 indicates that the cartridge C has been ejected.

In the ejection operation, as shown in FIG. 6, the second switching lever 63 is completely restored back in the X2 direction. At the moment the third switch SW3 has been turned on, the mode switching motor M2 stops. Whether or not the cartridge C has been completely ejected can be know by whether or not the first switch SW1 has been restored to the on state. In this way, completion of the operation of the mode switching means 50 driven by the motive power of the mode switching mode M2 can be detected by the third switch SW3, whereas the ejection of the cartridge C can be detected by the first switch SW1. This means that the detection of the completion of the operation of the mechanism portion of the mode switching means 50 and the detection of the ejection of the cartridge C can be performed separately, so that when the cartridge C has not been completely ejected, the motor M2 and the mechanism portion can be protected.

It is assumed, for example, that during the time in the mode changes from that of FIG. 5 to that of FIG. 4, the cartridge C gets caught in the cartridge holder 11 or an external force prevents the cartridge C from being completely pushed out in the X1 direction. In these cases, the first switching lever 54 causes the arm differential member 18 to be driven clockwise to the position shown in FIG. 4, but the drawing-in/ejection arm is prevented from rotating completely in the clockwise direction since the cartridge C is caught in the holder 11, causing it to stop rotating during the rotation. However, the stretching of the linking spring 19 linking the drawing-in/ejection arm 16 and the arm differential member 18 can prevent locking of the mechanism. In addition, even when the cartridge C is not completely ejected, and the first switch SW1 is not restored to the on state, the second switching lever 63 is completely restored in the X2 direction, so that at the moment the third switch SW3 has turned on the mode switching motor M2 stops.

Accordingly, with the cartridge C not completely ejected, the mode switching motor M2 continues rotating, without breaking of the motor, locked portion, or the like.

(Erroneous Insertion of Cartridge)

FIG. 14 shows the condition in which the cartridge C has been inserted with its front and back sides reversed in FIG. 4 in the insertion waiting mode of FIGS. 4 and 6. When the cartridge C is inserted with its front and back sides reversed, a side thereof without a shutter S faces the shutter opening member 11c, causing the insertion side end of the cartridge C to hit the shutter opening member 11c, thus preventing insertion of the cartridge C. In addition, the retainer recess C1 of the cartridge C does not oppose the retainer protrusion 32b that is thus pushed by a side face of the cartridge C and rotated in direction (i), when the device in the condition shown in FIG. 4. Thus, the first sliding shaft 32e at the bottom surface of the drawing-in member 32 projects from the cutout 36 of the guide plate 35 to the outside thereof. When the pusher ejection portion 33b is pushed in the X2 direction by the cartridge C in such a condition, the first sliding shaft 32e slides on the relief guide surface 35b corresponding to the outside surface of the guide plate 35.

The erroneously inserted cartridge C pushes the drawing-in/ejection mechanism 30 in the X2 direction, and the drawing-in/ejection arm rotates counterclockwise, causing the detecting piece 16b to move away from the insertion detection arm 21. When the first switch SW1 is turned off, the mode switching motor M2 starts to operate. This causes the first switching lever 54 to move in the X1 direction, causing the arm differential member 18 and the drawing-in/ejection arm 16 to rotate counterclockwise. However, at this time, in the drawing-in/ejection mechanism 30, the first sliding shaft 32e integrally formed with the drawing-in member 32 slides on the relief guide surface 35b of the guide plate 35 in the X2 direction, so that the retainer protrusion 32b, without drawing in the cartridge C, moves past the side portion of the cartridge C in the X2 direction, after which the subsequent operations are continued.

More specifically, the mode switching motor M2 continues rotating, and the mode changes to the reproduction mode of FIG. 8 or the recording mode of FIG. 9. However, since part of the cartridge C protrudes out the cartridge holder 11, in the reproduction mode or the recording mode, the cartridge holder 11 being tilted and not horizontal moves downward, with part of the cartridge C protruding therefrom, as shown in FIG. 11. However, the holder supporting member 12 and the cartridge holder 11 are rotatable at the linking portions 13, so that even when the cartridge holder 11 being tilted moves downward, the mechanism will not be locked.

Accordingly, when the cartridge C has been inserted with the wrong orientation, the drawing-in/ejection mechanism 30 will not hit the cartridge C and become locked. In addition, the mode switching motor M2 will not continue rotating, with the mechanism 30 in a locked state. This prevents the motor M2 from breaking down due to a larger load exerted thereto, and the locked mechanism from breaking.

In addition, the cartridge C is inserted only until it hits the shutter opening member 11c, and there is nothing that can be retained by the cartridge C, so that the cartridge C can be taken out any time.

As can be understood from the foregoing description, according to the present invention, the drawing-in member will not be retained by a recording medium that has been inserted with a wrong orientation. Further, even when the insertion of the recording medium has been detected and the driving member drives the drawing-in member in the drawing-in direction, the operation is continued until the end, so that the mechanical locking will not occur.

What is claimed is:

1. A driving device for a recording medium, comprising:

a holder for inserting therein a recording medium;

a drive portion for driving the recording medium that has been drawn into said holder;

a retainer member for engaging a retainer recess in a side portion of the recording medium inserted into said holder in order to apply a force to the recording medium for drawing in the medium;

a biasing member for biasing said retainer member at an insertion waiting position in a direction in which said retainer member is retained in the retainer recess of the recording medium;

a guide portion for guiding said retainer member in the drawing-in direction of the recording medium, so that said retainer member does not move out from the retainer recess;

a relief guide portion for guiding said retainer member, being pushed sideways by a side of the recording medium inserted with a wrong orientation, in the drawing-in direction, so that said retainer member is not retained by the recording medium; and a drive member for moving said retainer member in the drawing-in direction either along said guide portion or said relief guide portion;

a guide plate extending along a side of said holder, an inner surface of said guide plate facing said holder being said guide portion and an outer surface of said guide plate at the opposite side thereof being said relief guide portion, said guide plate further including a cutout being a division between said guide portion and said relief guide portion, wherein said retainer member includes a sliding portion for sliding along either one of said guide portion and said relief guide portion, said sliding portion being positioned at said cutout during an insertion waiting state, said sliding portion moving from said cutout to said guide portion when said retainer member is retained by said retainer recess, and said sliding portion moving from said cutout to said relief guide portion when said retainer member is pushed by said recording medium inserted with a wrong orientation.

2. A driving device for a recording medium according to claim 1, further comprising a detecting means and a drive source, wherein said detecting means is used for detecting that said retainer member has been pushed by said recording medium inserted with a correct orientation or by said recording medium inserted with a wrong orientation, and wherein said drive source is used to operate said drive member in the drawing-in direction with the detection of said detecting means.

* * * * *